UNITED STATES PATENT OFFICE.

JAMES PURVIS, OF BOWE'S PARK, AND THOMAS ROUSE, OF STAMFORD HILL, ENGLAND; HARRIETT COUTTS SHARP PURVIS, EXECUTRIX OF SAID PURVIS, DECEASED, AND SAID ROUSE ASSIGNORS, BY DIRECT AND MESNE ASSIGNMENTS, TO WILLIAM WALKER TAIT, OF PHILADELPHIA, PENNSYLVANIA.

MANUFACTURE OF ARTIFICIAL STONE.

No. 831,296.      Specification of Letters Patent.      Patented Sept. 18, 1906.

Application filed May 21, 1903. Renewed April 5, 1906. Serial No. 310,140.

*To all whom it may concern:*

Be it known that we, JAMES PURVIS, residing at "Elmswood," Bounds Green Road, Bowe's Park, in the county of Middlesex, England, (whose post-office address is 21 Great St. Helen's, London, E. C., England,) and THOMAS ROUSE, residing at 7 Old Hill street, Stamford Hill, in the county of Middlesex, England, (whose post-office address is 7 Old Hill street, Stamford Hill, London, N., England,) British subjects, have invented new and useful Improvements in the Manufacture of Artificial Stone, of which the following is a specification.

This invention relates to the manufacture of artificial stone in blocks, slabs, or bricks of cement, concrete, or of lime concrete, or partly of cement and partly of lime concrete—as, for instance, blocks, bricks, or slabs of lime concrete faced on one or more sides with cement concrete.

We prepare the cement concrete by mixing one part, by bulk, of Portland cement with from two to four parts of sand, broken or powdered granite, or other suitable hard material with sufficient water containing about one per cent. of commercial silicate of soda (water-glass) to moisten the mixture for molding.

We prepare the lime concrete by mixing in a closed vessel containing suitable mixing apparatus, such as revolving rakes, and into which vessel steam in just sufficient quantity to hydrate the materials, so that they will cohere when molded, is injected, one part of unslaked lime with eight to twelve parts, in bulk, of sand, pulverized quarry or mining waste, stone, gravel, slag, or mixtures of such materials, which mixtures contain a sufficient proportion of sand or silicious stone.

By the use of the revolving rakes, rotating at a high rate of speed, the materials are intermingled by a rotary raking action, and while in the agitated condition resulting from the use of these rakes the material is subjected to the steam above mentioned, which is thus permitted to thoroughly penetrate the particles and form a mass in a granular or powdery hydrated condition.

We manufacture a block, slab, brick, or tile of either the lime concrete prepared as above described or of the cement concrete prepared as above described or partly of such lime concrete and partly of such cement concrete. We can give the article a hard face by putting into a mold a layer of cement concrete, filling the mold to the required height with the lime concrete, and then subjecting the material to considerable pressure in the mold. The articles made of lime concrete alone or of cement concrete alone or of both lime concrete and cement concrete when removed from the mold are kept from eighty to one hundred and twenty hours in a chamber, which is purposely neither air nor steam tight and which has an adjustable air-inlet. Steam is injected into the chamber and circulates freely about the molded articles therein. The supply of steam must be sufficient to keep the atmosphere of the chamber saturated with vapor at 202° Fahrenheit for about the last fifty hours of the time above mentioned for articles containing lime concrete; but those of cement concrete alone should be kept in the chamber for not less than fifty hours at a temperature of 212° Fahrenheit. This treatment increases the cohesion of the lime concrete and its adherence to the cement concrete, besides which the article as a whole is hardened.

A block or other article may be molded with more than one of its sides faced with the cement concrete. For this purpose the cement concrete is applied to such of the sides of the mold as is desired, and lime concrete is added to fill the mold to the required height before pressure.

What we claim as our invention, and desire to secure by Letters Patent, is—

1. The herein-described method of making artificial-stone articles which consists in mixing unslaked lime with silicious material by subjecting the said materials to a rotary raking action and while said materials are intermingled in an agitated condition subjecting the same to the action of steam in a quantity sufficient for hydrating only, molding the resulting mixture into the shape desired and then subjecting the molded article to steam, substantially as described.

2. The herein-described method of making artificial-stone articles consisting in making a lime concrete by mixing unslaked lime with silicious material by agitation and while said materials are in an agitated condition subjecting the same to the action of steam, forming a second concrete of Portland cement, silicious material and silicate of soda, then forming the article of contacting layers of lime concrete and the cement concrete, substantially as described.

In testimony whereof we have respectively signed our respective names to this specification, in the presence of two subscribing witnesses, this 30th day of April, 1903.

JAMES PURVIS.
THOMAS ROUSE.

Witnesses:
 THOS. WILKINS,
 GEO. J. B. FRANKLIN.